Figure 2:
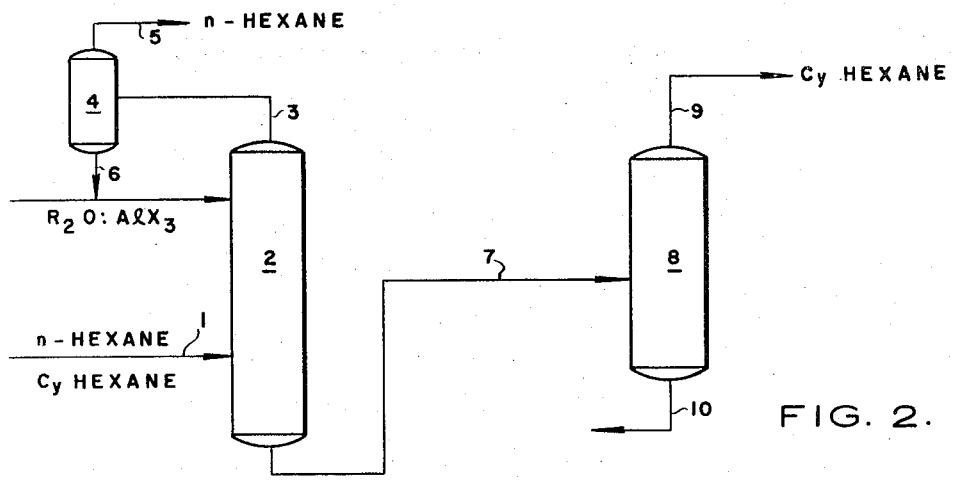

March 7, 1967 D. G. WALKER 3,308,176
SEPARATION OF PARAFFINS AND NAPHTHENES WITH AN ALUMINUM
HALIDE ETHERATE SELECTIVE SOLVENT
Filed Dec. 28, 1964

TERNARY PHASE
DIAGRAM
AT 25°C.

n-HEXANE
CYCLO HEXANE
$(CH_3)_2O:AlCl_3$

INVENTOR.
DAVID G. WALKER,
BY
ATTORNEY

United States Patent Office 3,308,176
Patented Mar. 7, 1967

3,308,176
SEPARATION OF PARAFFINS AND NAPHTHENES WITH AN ALUMINUM HALIDE ETHERATE SELECTIVE SOLVENT
David G. Walker, Baytown, Tex., assignor to Esso Research and Engineering Company, a corporation of Delaware
Filed Dec. 28, 1964, Ser. No. 421,219
4 Claims. (Cl. 260—666)

The present invention is directed to a method for separating paraffins and naphthenes by liquid-liquid extraction. More specifically, the invention deals with the methyl and ethyl etherate binary compounds of aluminum halides used as liquid-liquid extraction agents in separating paraffins and naphthenes. In its most specific aspects, the invention is concerned with the separation of close boiling paraffins and naphthenes by using a compound with the formula $R_2O:AlX_3$, where R is either methyl or ethyl and X is either Cl or Br.

The present invention may briefly be described as an extraction method for separating paraffins and naphthenes from a mixture containing both by the use of a liquid-liquid extraction agent having the formula $R_2O:AlX_3$, where R is either methyl or ethyl and X is either Cl or Br. It often occurs that paraffins and naphthenes are found in mixtures of very nearly the same volatilities and are thus extremely difficult to separate by distillation. The etherate addition compounds of the present invention have been found to be highly polar liquids which are only partially miscible with paraffins and naphthenes. They are nonvolatile at room temperature and possess relatively low melting temperatures for compounds of such polarity. Hence, the compounds are effective liquid-liquid extraction agents.

The etherate addition compounds are stable compounds of the methyl and ethyl ether and aluminum chloride or bromide having a molar ratio of 1:1. The compounds may be made by bubbling the ether through the solid aluminum chloride, for example. Excess ether may be removed by vacuum distilling. More specific methods of producing the etherates are found in the Journal of Physical Chemistry 64, 939 (1960) and 65, 1367 (1961).

The effectiveness of the etherate addition compounds of the present invention is illustrated by their ability to separate normal hexane and cyclohexane from a mixture containing both the normal hexane and cyclohexane. The ternary phase diagram for normal hexane, cyclohexane, and $(CH_3)_2O:AlCl_3$ shown in the drawings was obtained from experimental data. The ternary phase diagram was obtained by determining the solubility of the methyl etherate addition compound in normal hexane and likewise in the cyclohexane. It was then determined what the solubility of the normal hexane and the cyclohexane in the methyl etherate addition compound was, and the paraffin was about 1.8 mol percent soluble in the etherate addition compound and the naphthene about 13 mol percent soluble. Thereafter, several mixtures of normal hexane and cyclohexane in different proportions with the methyl etherate addition compound were mixed at 25° C. until two liquid phases were formed. Samples of the two liquid phases in contact with each other were taken and analyzed by NMR to determine its composition in terms of normal hexane, cyclohexane, and $(CH_3)_2O:AlCl_3$. The following tables exemplify the experimental data.

TABLE I

| Experimental No. | Component Added Grams | | |
|---|---|---|---|
| | $(CH_3)_2O:AlCl_3$ | Cyclohexane | n-Hexane |
| 1 | 5.0 | 5.0 | |
| 2 | 5.38 | 3.94 | 1.98 |
| 3 | 8.98 | 1.90 | 2.36 |
| 4 | 12.2 | 5.86 | 2.15 |
| 5 | 5.0 | | 5.0 |

The analyses obtained were:

TABLE II

| Experiment | Mol Percent | | |
|---|---|---|---|
| | $(CH_3)_2O:AlCl_3$ | Cyclohexane | n-Hexane |
| 1. Upper phase | 0.52 | 99.48 | |
| 1. Lower phase | 87 | 13 | |
| 2. Upper phase | <0.5 | 66 | 34 |
| 2. Lower phase | 87.5 | 11 | 1.5 |
| 3. Upper phase | <0.4 | 42 | 58 |
| 3. Lower phase | 90.5 | 6.2 | 3.3 |
| 4. Upper phase | | 19 | 81 |
| 4. Lower phase | 93 | 3 | 4 |
| 5. Upper phase | 0.2 | | 99.8 |
| 5. Lower phase | 98.2 | | 1.8 |

The experimental points are encircled on the ternary diagram with a solid tie-line drawn between each pair of liquids in equilibrium. Having sufficient points of the experimental mixtures to draw the lines on the ternary phase diagram, the areas are then defined where the mixture of normal hexane, cyclohexane, and the etherate addition compound will form two phases and those very small areas where they are completely miscible. The experimental data and the resulting phase diagram prove the excellent properties of the etherate addition compounds of the present invention as useful liquid-liquid extraction agents for separating mixtures of paraffins and naphthenes. The importance of these compounds is seen in the difference of solubility of the paraffin as compared to the naphthene wherein the latter is about six times as soluble in the etherate addition compound.

Figure 1:
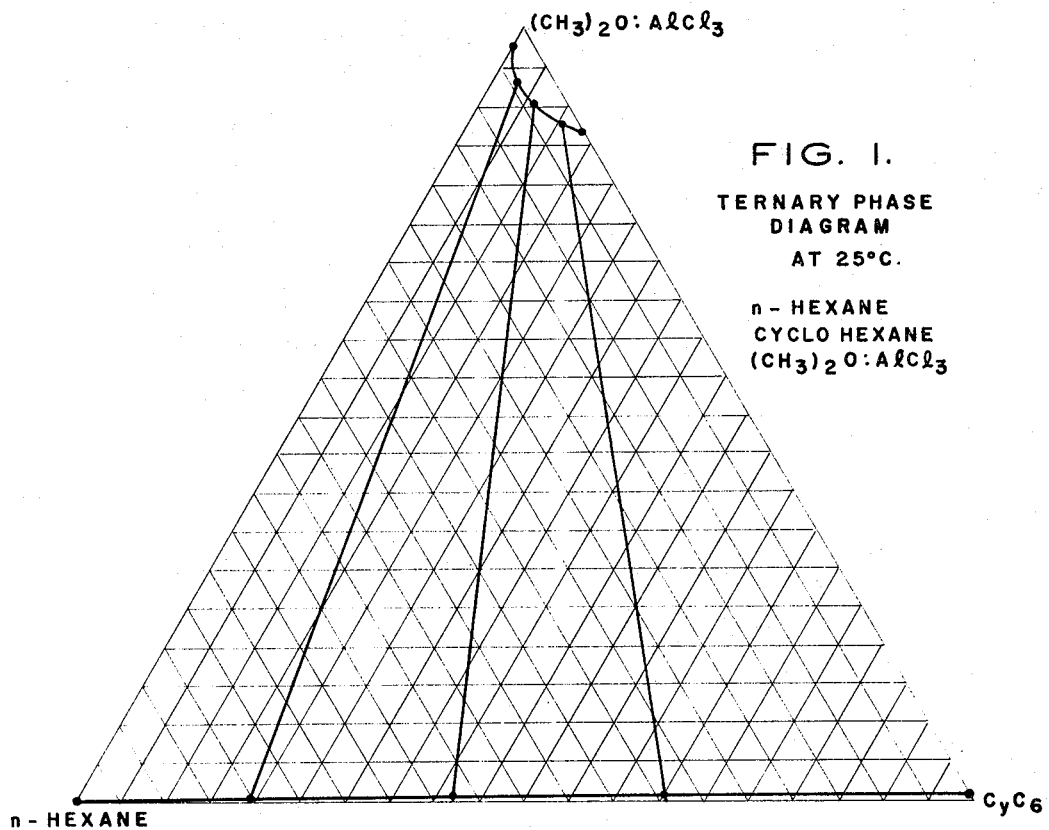

From the ternary phase diagram illustrated in FIGURE 1 of the drawings, it may be calculated how many theoretical extraction stages are required using a given ratio of the etherate addition compound of hydrocarbon feed to separate any mixture of cyclohexane and normal hexane. For example, it may be calculated from this ternary phase diagram that a stream of 30% cyclohexane and 70% normal hexane may be separated into two streams, one containing 90% cyclohexane and the other 10% cyclohexane by using a ratio of about 8:1 of $(CH_3)_2O:AlCl_3$ to hydrocarbon feed with eight theoretical extraction stages. The $(CH_3)_2O:AlCl_3$ may be easily separated from the cyclohexane-normal hexane mixture by simple distillation.

The process of the invention may be readily understood by reference to the attached drawing, wherein FIG. 2 sets forth a preferred mode for separating paraffins and naphthenes.

A stream of 30% cyclohexane and 70% normal hexane is introduced by line 1 into an extraction zone 2. The extraction zone 2 is an extractive distillation column, such as a spray tower, a pack tower, a baffle tower, a perforated plate tower, or any other type column having dispersion contactors, equivalent to eight theoretical extraction stages. At the top of the column by line 3 is introduced an etherate addition compound of the present invention, such as $(CH_3)_2O:AlCl_3$, and passed in continuous contact with the mixture of normal hexane and cyclohexane. The extraction is preferably carried out at room temperature (about 25° C.) and about one atmosphere of pressure. The raffinate phase is removed from line 3 overhead to a flash drum 4 wherein the normal hexane saturated with the etherate addition compound is heated or is heated under a vacuum to flash off relatively pure (90%) normal hexane by line 5. The condensate is removed by line 6 and may be recycled to the extraction zone 2. The extract phase is removed by line 7 which is enriched in the cyclohexane and is introduced to a flashing drum or distillation column 8 which is heated under one atmosphere of pressure so that the cyclohexane (90%) comes overhead by line 9. The etherate addition compound is removed by line 10 and may be recycled and used again in extraction zone 2.

The effectiveness of the etherate addition compounds of the present invention are further shown by the following molecular properties with regard to methyl etherates:

TABLE III.—MOLECULAR PROPERTIES OF $(CH_3)_2O:AlX_3$

| Molecular Formula | M.P., °C. | At 40° C. (ml.) Molar Volume [1] | Solubility Parameter 26–40° C. ($\gamma$) |
| --- | --- | --- | --- |
| $(CH_3)_2O:AlCl_3$ | 29.3 | 139 | [2] 12.2 [3] 11.6 |
| $(CH_3)_2O:AlBr_3$ | 39.4 | 151 | [2] 12.0 [3] 11.5 |

[1] Measurement in milliliters of 1 g. mol of the pure compound.
[2] For solubility of $(CH_3)_2O:AlX_3$ in paraffins.
[3] For solubility of paraffins in $(CH_3)_2O:AlX_3$.

The solubility parameter is given in Table III for the etherates of the pure compound and selected hydrocarbons. This measurement is based on a technique and theory described by J. H. Hildebrand and R. L. Scott in their book, The Solubility of Non-Electrolytes, 3rd Ed., Reinhold Publishing Corp., New York, New York (1950). From the properties which have been measured, a prediction may be made generally as to the type and nature of the solubility of the pure etherate addition compounds with most other hydrocarbons. Thus, by a comparison of the solubility parameter as found in the Hildebrand number, a comparison may be made with the Hildebrand numbers set forth on pages 435 to 439 of The Solubility of Non-Electrolytes. As a class, the etherate addition compounds of the present invention are excellent compounds for separating other hydrocarbons which have Hildebrand solubility parameters of from about 6 to about 8.4 by liquid-liquid extraction.

The Hildebrand solubility parameters of paraffins are found to be generally between about 6.5 and 7.5. On the other hand, the Hildebrand solubility parameters of naphthenes are between 7.8 and 8.2. The finding of a highly polar liquid having a low melting temperature and an intrinsic Hildebrand solubility parameter of about 11.5 to about 12.5 is valuable in that the paraffins and naphthenes generally or even other close boiling mixtures may be easily separated by liquid-liquid extraction using the etherate addition compounds of the present invention as extraction agents. As is more fully set forth by J. H. Hildebrand and R. L. Scott in their book, The Solubility of Non-Electrolytes, which is herein incorporated by reference, the finding of a liquid having intrinsic Hildebrand solubility parameters of the etherate addition compounds of the present invention may be used to calculate the relative solubilities of many compounds and to predict their separation in various mixtures. Thus, specifically following the description found on pages 134 to 149 of The Solubility of Non-Electrolytes, the solubility of various compounds and $(CH_3)_2O:AlCl_3$ may be calculated. These calculated solubilities are illustrated in the following table:

TABLE IV.—CALCULATED SOLUBILITY OF SOME COMPOUNDS IN $(CH_3)_2O:AlCl_3$ FROM THEIR SOLUBILITY PARAMETER AND MOLAR VOLUMES

| | Calculated solubility at 25° C. molar percent |
| --- | --- |
| n-Hexane | 1.8. |
| n-Heptane | 1.5. |
| Cyclohexane | 30–40. |
| Methyl cyclohexane | 5–10. |
| Benzene | Soluble in all proportions. |

While the technique and theory described by Hildebrand and Scott does not provide an absolute means for calculating a specific separation for a given mixture, the use of this theory and technique does provide for determining whether a compound is effective as a liquid-liquid extraction agent. The finding of the intrinsic Hildebrand solubility parameters for the etherate compounds of the present invention proves their effectiveness as liquid-liquid extraction agents in separating paraffins and naphthenes.

The nature and object of the present invention having been completely described and illustrated and the best mode thereof contemplated set forth, what I wish to claim as new and useful and secure by Letters Patent is:

1. A method for separating close boiling paraffins and naphthenes from a mixture thereof which comprises extracting said mixture in a liquid-liquid extraction zone with a compound of the formula: $R_2O:AlX_3$, where R is selected from the group consisting of methyl and ethyl and X is selected from the group consisting of Cl and Br whereby a raffinate phase enriched with paraffins and an extract phase enriched with naphthenes is formed and separating said phases to recover said enriched paraffins and naphthenes.

2. A method according to claim 1 wherein said naphthenes are the $C_5$ to $C_{12}$ naphthenes.

3. A method for separating n-hexane and cyclohexane from a mixture thereof which comprises extracting said mixture in a liquid-liquid extraction zone with a compound of the formula: $R_2O:AlX_3$ where R is selected from the group consisting of methyl and ethyl and X is selected from the group consisting of Cl and Br whereby a raffinate phase enriched with n-hexane and an extract phase enriched with cyclohexane is formed and separating said phases to recover said enriched n-hexane and cyclohexane.

4. A method according to claim 3 wherein said compound is $(CH_3)_2O:AlCl_3$.

References Cited by the Examiner

UNITED STATES PATENTS 2,257,086  9/1941  Atwell _____ 260—676

FOREIGN PATENTS 878,647  6/1953  Germany.

DELBERT E. GANTZ, *Primary Examiner.*

H. LEVINE, *Assistant Examiner.*